United States Patent [19]

Matsuno

[11] Patent Number: 4,494,619
[45] Date of Patent: Jan. 22, 1985

[54] COMBINATORIAL WEIGHING APPARATUS WITH BULK AND FINE FEED

[75] Inventor: Tadaaki Matsuno, Shiga, Japan

[73] Assignee: Kabushiki Kaisha Ishida Koki Seisakusho, Kyoto, Japan

[21] Appl. No.: 506,797

[22] Filed: Jun. 22, 1983

[30] Foreign Application Priority Data

Jun. 23, 1982 [JP] Japan .................................. 57-107791
Dec. 27, 1982 [JP] Japan .................................. 57-234637

[51] Int. Cl.$^3$ ........................ G01G 19/22; G01G 13/02
[52] U.S. Cl. ........................................ 177/25; 177/123
[58] Field of Search ............................. 177/1, 25, 123

[56] References Cited

U.S. PATENT DOCUMENTS

| | | | | |
|---|---|---|---|---|
| 3,938,601 | 2/1976 | Hobart | .............................. | 177/123 X |
| 3,945,448 | 3/1976 | Sellers | .............................. | 177/123 X |
| 4,341,274 | 7/1982 | Hirano et al. | .......................... | 177/25 |
| 4,399,880 | 8/1983 | Konishi | .............................. | 177/25 X |

*Primary Examiner*—George H. Miller, Jr.
*Attorney, Agent, or Firm*—Staas & Halsey

[57] ABSTRACT

A combinatorial weighing apparatus includes a circuit for presetting at least one weighing machine which discharges articles for rough charging or selecting at least one weighing machine which discharges articles for rough charging according to a prescribed rule, a combinatorial computing device for computing, as a rough charging weight value, a total weight of articles discharged from preset or selected weighing machines and for selecting a combination of weighing machines which gives a total weight combination equal or closest to a corrective charging weight value which is the difference between a target weight value and the rough charging weight value. The combinatorial weighing apparatus further includes a discharge control means for discharging the rough charging articles from the preset or selected weighing machines at a prescribed timing and for discharging articles for corrective charging from the selected combination of weighing machines at another timing. Rough and corrective charging chutes are provided for collectively discharging rough and corrective charging articles into respective locations. Rough and corrective charging weight data are provided in a single cycle of supplying articles into weighing machines and weighing the articles therein. The rough and corrective chutes are actuatable in coaction with a device for supplying a plurality of containers to a first position in which articles providing the rough charging weight value are charged from the rough charging chute into the containers and articles providing the corrective charging weight value are charged from the corrective charging chute into containers in a second position.

9 Claims, 9 Drawing Figures

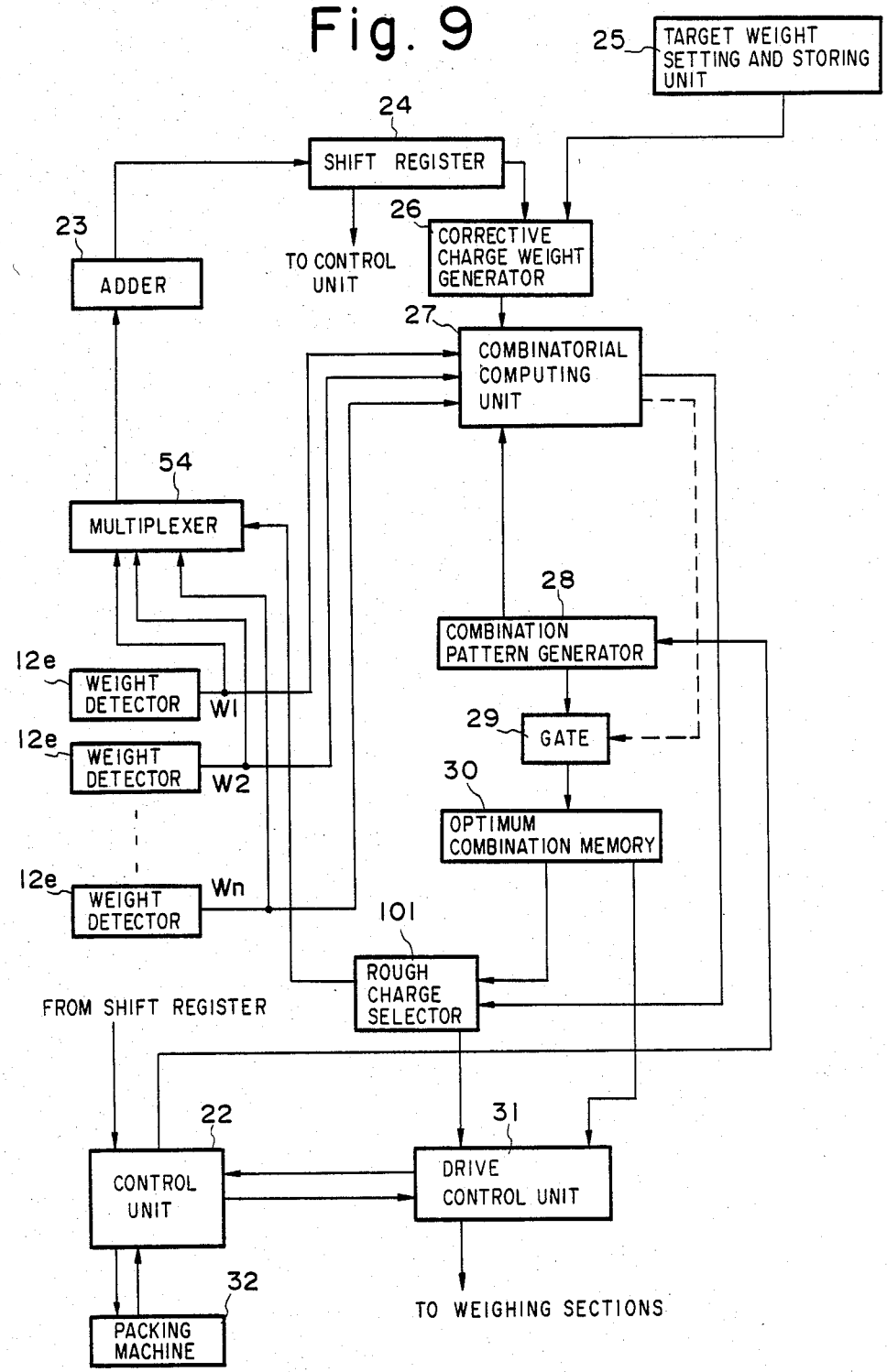

COMBINATORIAL WEIGHING APPARATUS WITH BULK AND FINE FEED

BACKGROUND OF THE INVENTION

The present invention relates to a combinatorial weighing apparatus, and more particularly to a combinatorial weighing apparatus suitable for use in weighing and packaging articles of relatively large volumes.

Automatic combinatorial weighing apparatus include a plurality of weighing machines composed of hoppers supplied with articles to be weighed and weight detectors for measuring the weights of the articles charged into the weighing hoppers. The combinatorial weighing apparatus effects a combinatorial arithmetic operation to select a combination of weighing machines which give a total weight closest to a target weight within a preset allowable weight range, discharges the articles from the selected weighing machines, and supplies new articles into the emptied weighing machines. The above cycle of operation is repeated for a continuous automatic weighing operation. The articles are discharged in one batch from the weighing apparatus to a packing machine. No problem arises where the volumes of the articles discharged in one batch are small. However, relatively large volumes of articles tend to cause various problems due to a poor charging efficiency at the time the large-volume articles are put into cartons, bags and other containers. To increase the charging efficiency for articles of large volumes, it has been conventional to add many charging steps such as for vibrating or pressing the articles discharged from the weighing hoppers. Such additional charging steps result in a longer weighing and packing time, and require a larger space of installation of the overall weighing and packing system. The weighing apparatus has also suffered from troubles such as a bridge of articles in a discharge port since a large quantity of articles are rushed into the discharge port at one time.

One solution to the foregoing problems has been to use two weighing apparatus. One of the weighing apparatus weighs and discharges a number of articles which have a total weight smaller than a target weight. Thereafter, the other weighing apparatus corrects the weight of the remaining articles and discharges them. This system is based on the principle that articles can be charged more efficiently by being divided into two groups than by being vibrated and pressed in one batch. However, this system requires two article supply lines, with the result that the overall arrangement becomes large in size and takes up an inceased area for installation.

SUMMARY OF THE INVENTION

It is an object of the present invention to provide a combinatorial weighing apparatus which requires a small space for installation, is free from troubles such as a bridge of articles in a discharge port, and has a better charging efficiency.

Another object of the present invention is to provide a combinatorial weighing apparatus suitable for use in weighing articles of relatively large volumes.

According to the present invention, a combinatorial weighing apparatus comprises means for presetting at least one weighing machine which discharges articles for rough charging or selecting at least one weighing machine which dischages articles for rough charging according to a prescribed rule. The apparatus also includes combinatorial computing means for computing, as a rough charging weight value, a total weight of articles discharged from the preset or selected weighing machine and for selecting a combination of weighing machines which gives a total weight combination equal or closest to a corrective charging weight value which is the difference between a target weight value and the rough charging weight value. Discharge control means discharges the rough charging articles from the preset or selected weighing machine at a prescribed timing and discharges articles for corrective charging from the selected combination of weighing machines at another timing, and a chute collectively discharges the separately discharged rough and corrective charging articles into a single location.

Another combinatorial weighing apparatus according to the present invention has a rough charging chute for collectively discharging, into a single location, articles giving a rough charging weight value smaller than a target weight value, combinatorial computing means for selecting a combination of articles which gives a total weight combination equal or closest to a corrective charging weight value which is the difference between the target weight value and the rough charging weight value, and a corrective charging chute for collectively discharging into a single location the selected articles. These chutes are actuatable in coaction with a device for supplying a plurality of containers to a first position in which articles are charged from the rough charging chute into the containers and supplying a plurality of containers to a second position in which the articles are charged from the corrective charging chute into the containers. Rough and corrective charging weight data are provided by a plurality of weight data items produced in a single cycle of supplying articles into the weighing machines and measuring weights of articles therein. The articles giving the rough charging weight value are charged into a container through the rough charging chute in the first position, and the articles giving the corrective charging weight value are charged into a container through the corrective charging chute in the second position.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 9 is a block diagram of a combinatorial computing apparatus according to a sixth embodiment of the present invention.

DESCRIPTION OF THE PREFERRED EMBODIMENTS

Figure 1:
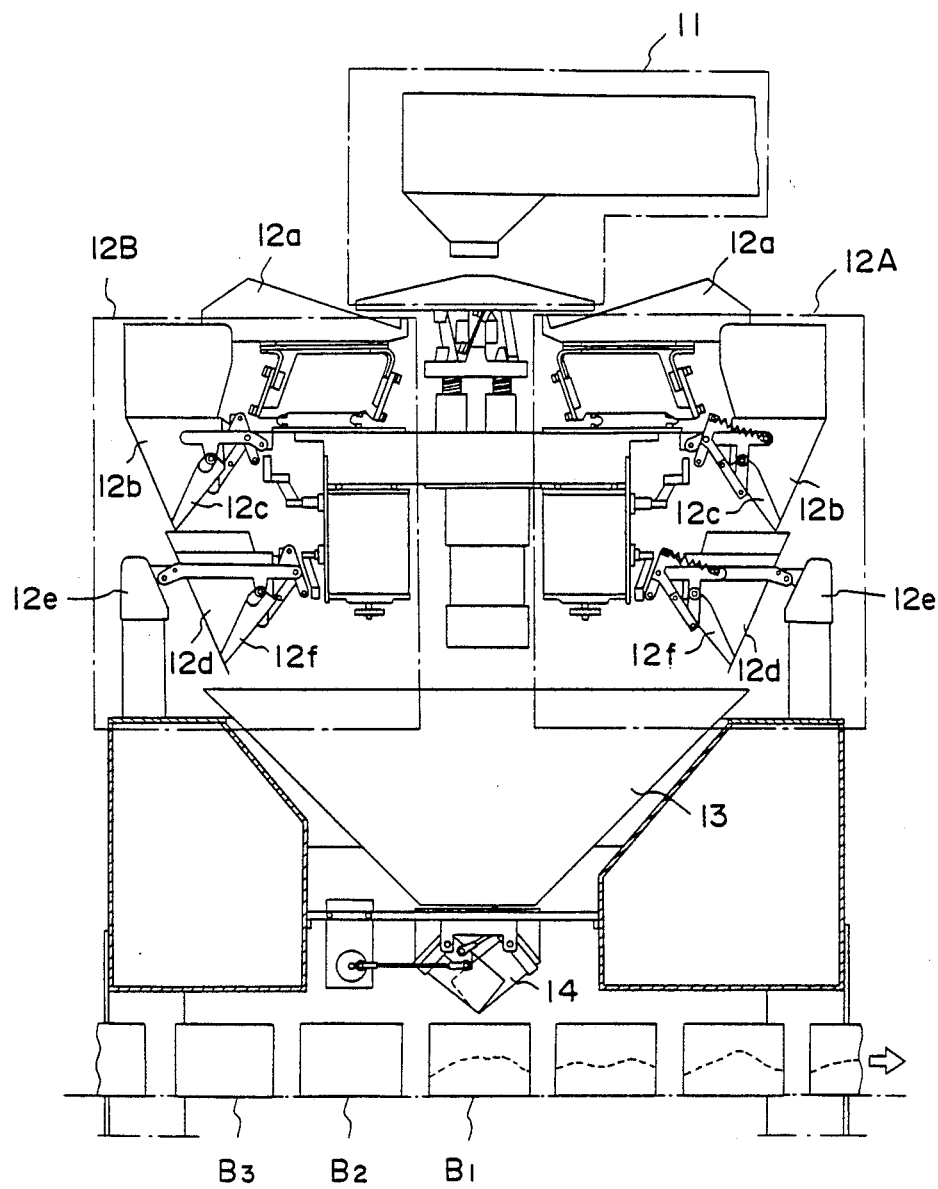
FIG. 1 is a side elevational view, partly broken away, of the mechanism of a combinatorial weighing apparatus according to a first embodiment of the present invention.

FIG. 1 illustrates the mechanism of a combinatorial weighing apparatus according to the present invention. The combinatorial weighing apparatus includes a main supply unit 11 for supplying articles to be weighed into a plurality of weighing sections so as to be distributed radially outward. The main supply unit 11 is of a vibratory conveyance type which is vibratable for a prescribed period of time to supply articles to the weighing sections. The weighing sections, designated at 12A, ... , 12B, ..., which are n in number and are positioned radially outward of the main supply unit 11, only two weighing sections are shown in FIG. 1. Each of the weighing sections is composed of a dispersion supply unit 12a, a pool hopper 12b, a pool hopper gate 12c, a weighing hopper 12d, a weight detector 12e, and a weighing hopper gate 12f. The dispersion supply unit 12a comprises an independently vibratable feeder conveyor or an independently actuatable shutter device for charging articles into the pool hopper 12b disposed below the dispersion supply unit 12a. The pool hopper 12b is equipped with the pool hopper gate 12c which when opened, allows the articles to be charged from the pool hopper 12b into the weighing hopper 12d. The weighing hopper 12d is associated with the weight detector 12e for measuring the weight of the articles charged in the weight hopper 12d, the measured weight being furnished to a combinatorial computing unit described later on. The weighing hopper gate 12f is opened by a command from a drive control unit (not shown in FIG. 1) for discharging the articles from the weighing hopper. The weighing hopper, the weighing hopper gate, and the weight detector jointly constitute a weighing machine. Some number (m) of the weighing sections 12A, 12B, ... are predetermined as giving rough weights, and the other weighing sections serve to select a combination of weighing machines which give a weight combination equal or closest to a corrective charging weight.

The weighing section 12A will hereinafter be described as a corrective charging section, and the weighing section 12B as a rough charging section. The articles dischaged from the weighing machines are collected by a chute 13 downward to a central position. The chute 13 is of a pyramidal funnel shape for collecting the articles discharged onto an outer peripheral edge of the chute 13, by gravity or forcibly by a scraper (not shown), toward the central portion thereof. A timing hopper 14 is located below the chute 13 for temporarily storing the articles collected by the chute 13 and then charging the articles into a container located outside of the weighing apparatus in response to a discharge signal issued from a packing machine or other external source. Containers B1, B2, B3, ... are arranged in a row to pass successively through a point P (immediately below the timing hopper) where articles are charged from the timing hopper 14 into one of the containers.

Fundamental operation of the weighing apparatus will be described with reference to FIG. 1. It is assumed here that there are a total of n weighing sections 12A, . . . , 12B, . . . , and a target weight value is X (g).

Articles supplied from the main supply unit 11 are divided in a radially outwrd direction by the diversion supply units 12a, 12a, ... and then charged into the pool hoppers 12b, 12b, ..... Then, the pool hopper gates 12c 12c, ... are opened to discharge the articles into the weighing hoppers 12d, 12d, ..... The dispersion supply units 12a, 12a, ... are than driven and simultaneously the pool hopper gates 12c, 12c, ... are closed to allow articles to be charged again into the pool hoppers 12b, 12b, ..... When the apparatus has stopped vibrating after a time interval set by a timer, the articles are weighed by the weight detectors 12e, 12e, ..... As the weighing operation starts, the articles having a rough charging weight N1 (g) are charged from the weighing hoppers 12d, 12d, ... of the m rough charging weighing sections 12B, 12B, ... ($1 \leq m \leq n$) through the chute 13 into the timing hopper 14. Then, the articles are discharged from the timing hopper 14 into the container B1. Simultaneously with this, a corrective charging weight, which is the difference between the target weight X (g) and the rough charging weight N1 (g), is computed, and those weighing machines which give a combined sum weight equal or closest to the corrective charging weight are selected from weighing machines other than the m rough charging weighing sections through a combinatorial arithmetic operation. Thereafter, the weighing hopper gates 12f, 12f, ... of the weighing hoppers 12d, 12d, ... of the selected weighing machines are opened to permit corrective charging articles to fall down the chute 13 into the timing hopper 14. Upon elapse of a given period of time, the weighing hopper gates 12f, 12f, ... are closed and the pool hopper gates 12c, 12c, ... are opened to charge new articles from the pool hoppers 12b into the rough charging and corrective charging weighing hoppers 12d, 12d, ... from which the articles have been discharged. When another interval of time has elapsed, the pool hopper gates 12c, 12c, ... are closed, and the dispersion supply units 12a, 12a, ... are driven to supply articles into the pool hoppers 12b, 12b, ... from which the articles have been discharged into the weighing hoppers 12d, 12d, ...

In response to a signal from the packing machine, the articles which have been collected in the timing hopper 14 are additionally charged into the container B1 in which the rough charging articles N1 have already been charged. More specifically, when the timing hopper 14 is opened in response to the signal from the packing machine, the corrective charging articles giving a total weight equal or closest to the corrective charging weight (X−N1) are additionally charged into the container B1, which is now supplied with the articles having the target weight X.

Figure 2:
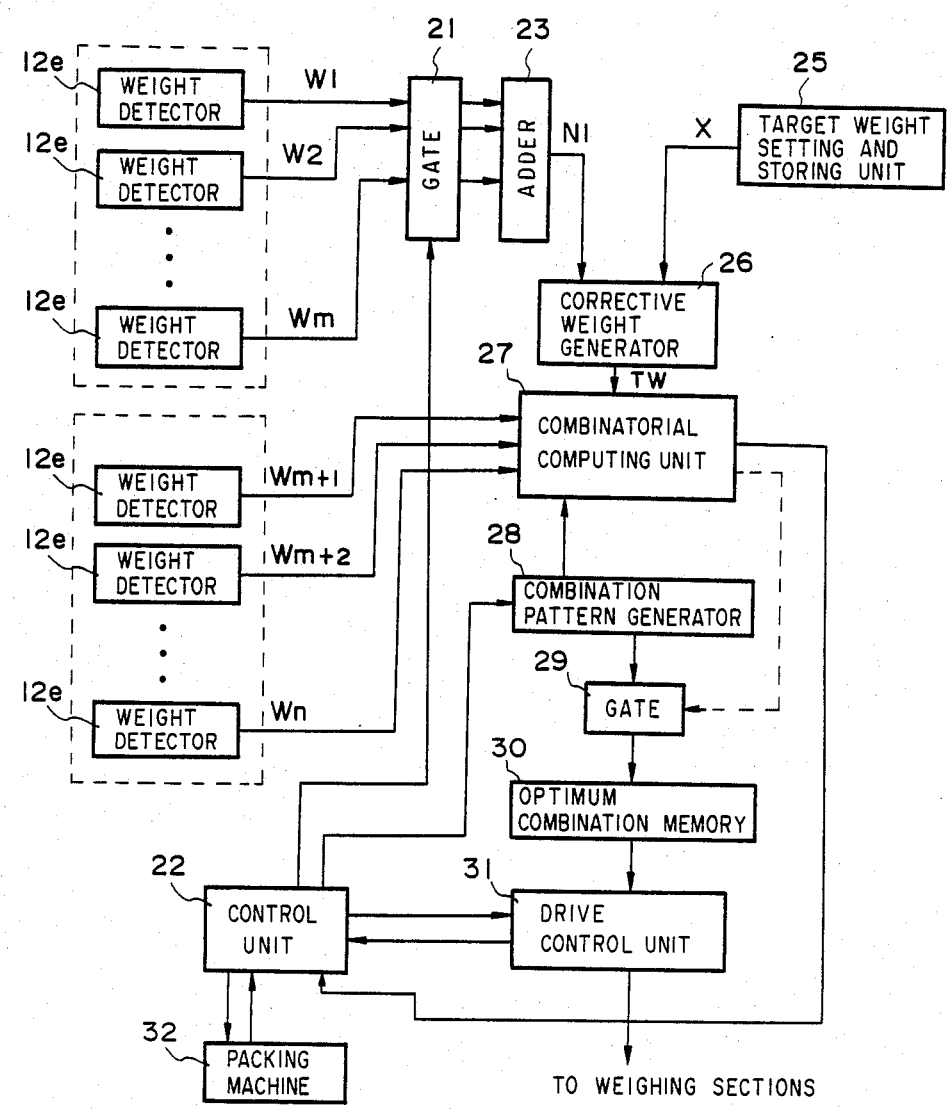
FIG. 2 is a block diagram of a combinatorial computing apparatus incorporated in the combinatorial weighing apparatus of FIG. 1.

FIG. 2 is a block diagram of combinatorial computing apparatus. Of the n weight detectors 12e, the m weight detectors producing weight values W1–Wm are assumed to be associated with the weighing hoppers 12d of the rough charging weighing sections 12B, 12B, ..., and the (n–m) weight detectors producing weight values Wm+1, Wm+2, ... Wn are assumed to be associated with the weighing hoppers of the corrective charging weighing sections 12A, 12A, . . . . When the weighing operation is started, a gate 21 is opened in response to a signal from a control unit 22 to allow the weight values W1-Wm from the rough charging weighing weight detectors 12e, 12e, . . . to be delivered to an adder 23. The adder 23 computes a sum N1 of the supplied weight values, and issues the sum N1 as a rough charging weight. A target weight setting and storing unit 25 sets and stores a target weight value X (g) which is furnished to a corrective charging weight generator 26. The corrective charging weight generator 26 is also supplied with the rough charging weight N1 and computes and issues a corrective charging weight TW which is the difference between the target weight X and the rough charging weight N1. A combinatorial computing unit 27 receive a combination pattern supplied from a combination pattern generator 28 for selecting and adding some of the outputs Wm+1 through Wm from the weight detectors 12e, 12e, . . . of the corrective charging weighing sections, for computing a deviation or error between the total weight and the corrective charging weight TW, and for comparing the deviation or error with a stored content of an error memory (not shown) in the combinatorial computing unit 27. If the error is smaller than the stored data in the error memory, then the computed error is stored in the error memory and at the same time a gate 29 is opened to allow the combination pattern being generated by the combination pattern generator 28 to be stored in an optimum combination memory 30. Initial data stored in the error memory is equal to an upper limit of a preset allowable weight range. Accordingly, the stored data in the error memory at any time is equal to the difference or error between the corrective charging weight and one of the weight sums obtained for corrective charging through combinatorial arithmetic operations, which is closest to the corrective charging weight within the preset allowable weight range. The combination pattern generator 28 comprises an (n−m)-bit counter for counting ($2^{n-m}-1$) clock pulses (not shown) to generate ($2^{(n-m)}-1$) combination patterns. The bits of the (n−m)-bit counter correspond respectively to the corrective charging weighing sections. When the ith bit of the combination patterns is "1", the output from the ith weight detector belonging to the ith corrective charging weighing section is delivered to the combinatorial computing unit 27. If, for example, a combination pattern (0100000011) is generated providing n=15, m=5, and n−m=10, the weights W6, W7, and W14 from the first, second, and ninth weight detectors are delivered to the combination computing unit 27. The combination computing unit 27 effects the computation of an error between the sum of added weights and the corrective charging weight, the comparison between the error and the stored data in the error memory, and the renewal of the error memory and the optimum combination memory 30. When an optimum combination pattern is determined, a drive control unit 31 opens the weighing hopper gates 12f, 12f, . . . of the weighing hoppers 12d, 12d, . . . which give the optimum weight combination to discharge corrective charging articles into the chute 13.

Weighing operation of the mechanism and combinatorial computing apparatus shown in FIGS. 1 and 2 will be described. It is now assumed that the number of all weighing sections is 15 (n=15), the number of rough charging weighing sections is 5 (m=5), and a target weight is X (g).

The main supply unit 11 supplies articles into the dispersion supply units 12a, 12a, . . . dependent on how many articles have been discharged by the weighing apparatus, and the pool hoppers 12b, 12b, . . . , and the weighing hoppers 12d, 12d, . . . contain small numbers of articles, which are weighed by the weight detectors 12e, 12e, . . . .

For a first cycle of the weighing operation, the control unit 22 issues a signal to the gate 21 to open the latter, whereupon the adder 23 computes the sum N1 of the weights W1-W5 of the articles contained in the weighing hoppers assigned to the rough charging weighing sections, and delivers the computed sum N1 to the corrective weight generator 26 as a rough charging weight. Then, the control unit 22 applies an opening command to the drive control unit 31 to open the weighing hopper gates 12f, 12f . . . of the rough charging weighing hoppers. The weighing hopper gates 12f, 12f, . . . of the rough charging weighing hoppers are opened for a certain period of time to discharge articles from all of the rough charging weighing hoppers down the chute 13 into the timing hopper 14. In response to a discharge-permit signal from a packing machine 32, the control unit 22 issues a discharge signal to the drive and control unit 31 to open the timing hopper 14 for thereby discharging the rough charging articles from the timing hopper 14 into the container B1 positioned directly below.

At the same time, the corrective weight generator 26 effects the arithmetic operation:

$$X-N1=TW$$

to find the corrective charging weight TW and furnishes the latter to the combinatorial computing unit 27. Thereafter, the control unit 22 commands the combination pattern generator 28 to start generating combination patterns. The combinatorial computing unit 27 effects combinatorial computations to select a combination of the corrective charging weighing sections which gives a weight combination closest to the corrective charging weight TW, and stores the selected weight combination in the memory 30. After the combinatorial computations have been finished, the combinatorial computing unit 27 applies an end signal to the control unit 22, which then issues a series of supply and discharge start signals to the drive control unit 31. The drive control unit 31 now opens the weighing hopper gates and closes the pool hopper gates of those weighing sections 12A, 12A, . . . which correspond to bits "1" in the optimum combination memory 30. The opened weighing hopper gates and pool hopper gates will be closed upon elapse of an interval of time set by a timer. The drive control unit 31 also drives the dispersion supply units.

In response to a signal indicative of the opening of the weighing hopper gates by the drive control unit 31 and upon elapse of a given period of time, the control unit 22 waits for a discharge-permit signal from the packing machine 32, and issues a discharge command to the drive control unit 31 upon receipt of such a discharge-permit signal and also a signal indicative of an article discharge to the packing machine 32. The drive control unit 31 is responsive to the discharge command for opening the timing hopper 14 to discharge the corrective charging articles into the container B1.

The foregoing cycle of operation will be repeated.

Figure 3:
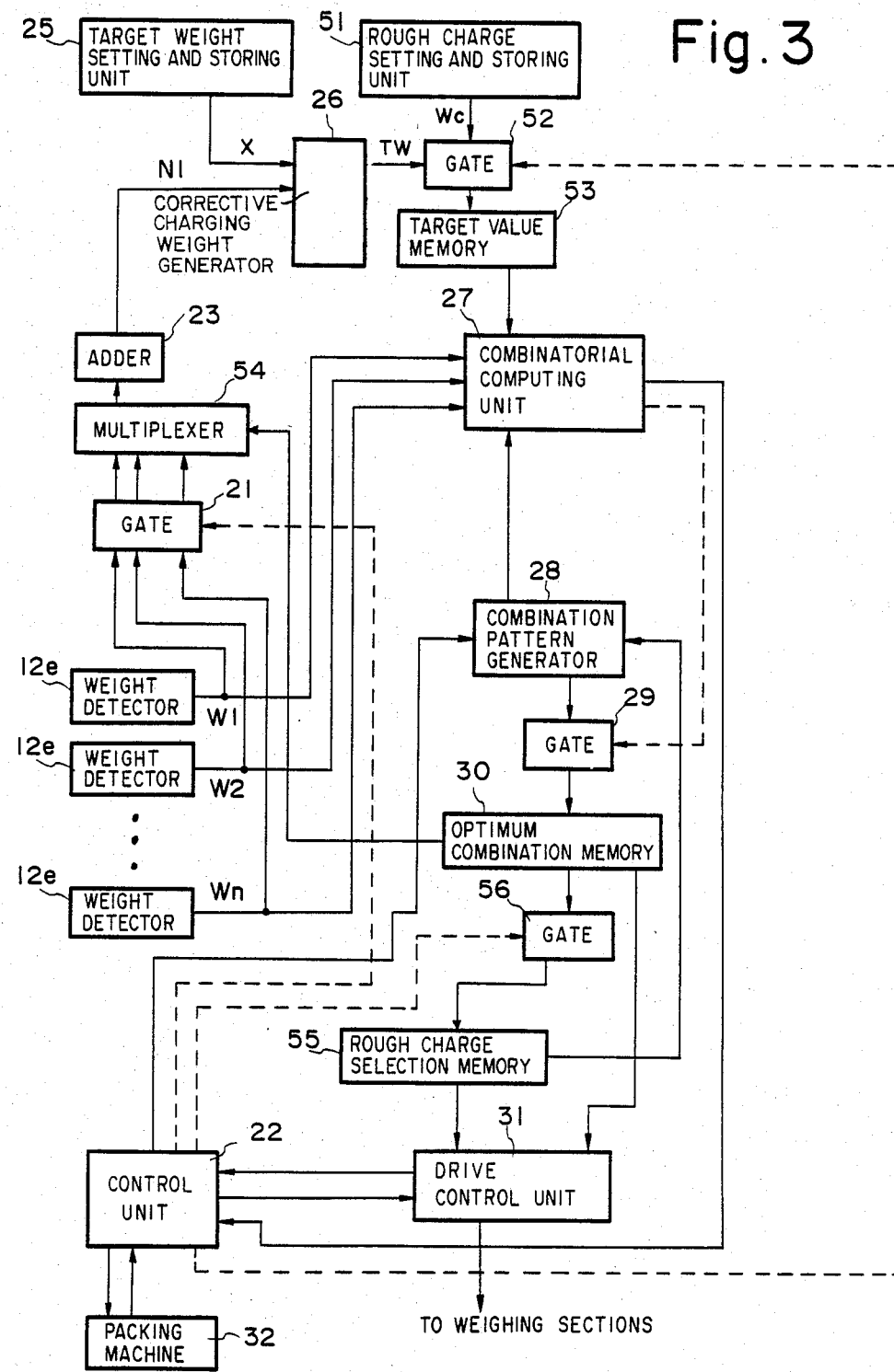
FIG. 3 is a block diagram of a combinatorial weighing apparatus according to a second embodiment of the present invention.

FIG. 3 is a block diagram of a combinatorial weighing apparatus according to a second embodiment of the present invention. In the combinatorial weighing apparatus shown in FIG. 3, a rough charging weight value is established separately from a target weight value. Identical parts in FIG. 3 are denoted by identical reference characters in FIGS. 2. With the weighing apparatus according to the first embodiment, the weighing sections are divided into rough and corrective charging weighing sections. However, the weighing sections in the weighing apparatus of the second embodiment are not divided, but can be used for both rough and corrective charging operations.

A rough charge setting and storing unit 51 serves to set and store a target for a weight measured for rough article charging (hereinafter referred to as a "target rough weight Wc"). A gate 52 is responsive to a signal from a control unit 22 for inputting the corrective weight TW generated from a corrective weight generator 26 or the target rough weight Wc stored in the rough charge setting and storing unit 51 into a target value memory 53. A combinatorial computing unit 27 effects combinatorial computations with the stored content of the target value memory 53 being used as a target value. A gate 21 opens under a command from the control unit 22 to transmit outputs from the weight detectors 12e, 12e, ... to a multiplexer 54. The multiplexer 54 is responsive to data stored in an optimum combination memory 30 for successively delivering the outputs from the weight detectors 12e of the weighing sections corresponding to "1" bits in the memory 30 to an adder 23. A rough charge selection memory 55 serves to take in and store the data from the optimum combination memory 30 when a gate 56 is opened. The weighing sections which are actuated by a drive control unit 31 to discharge articles are indicated by the rough charge selection memory 55 and the optimum combination memory 30. The rough charge selection memory 55 contains the result of a rough charging weighing operation, while the optimum combination memory 30 contains the result of a corrective charging weighing operation.

Operation of the combinatorial weighing apparatus shown in FIG. 3 will be described.

The main supply unit 11 (FIG. 1) supplies articles into the dispersion supply units 12a, 12a, ... dependent on how many articles have been discharged by the weighing apparatus, and the pool hoppers 12b, 12b, ..., and the weighing hoppers 12d, 12d, ... contain small numbers of articles, which are weighed by the weight detectors 12e, 12e, .... The control unit 22 controls the gate 52 to allow the target rough weight Wc, stored in the rough charge setting and storing unit 51, to be stored in the target memory 53, and enables the combination pattern generator 28 to start generating combination patterns. Combinatorial computations are effected by the combinatorial computing unit 27 with the stored data Wc in the rough charge setting and storing unit 51 serving as a target. The optimum combination memory 30 stores a weight combination having bits "1" corresponding to the selected weighing sections. In response to a signal indicative of the ending of the combinatorial computations supplied from the combinatorial computing unit 27, the control unit 22 issues an opening command to the gate 21. The multiplexer 54 successively delivers the weight data (W1, W1, ... Wn), from the weighing sections corresponding to bits "1" of the data stored in the optimum combination memory 30, to the adder 23. The adder 23 computes the sum of the weight data and issues the sum as a rough charging weight N1. The corrective charging weight generator 26 computes the difference (X−N1) between the target weight X and the rough charging weight N1, and issues the difference as a corrective charging weight TW through the gate 52 to the target memory 53. The control unit 22 is also responsive to the combinatorial computation end signal for opening the gate 56 to allow transmission of the data from the optimum combination memory 30 to the rough charge selection memory 55 55. Thereafter, the control unit 22 issues a series of supply and discharge start siganls to the drive control unit 31. The drive control unit 31 then discharges the rough charging articles down the chute 13 into the timing hopper 14 based on the optimum combination pattern. A predetermined period of time after the articles have been discharged, the control unit 22 waits for a discharge-permit signal from the packing machine 32 and then delivers a discharge signal to the drive control unit 31 in response to the discharge-permit signal. The drive control unit 31 is responsive to the discharge signal for opening the timing hopper 14 for a given interval of time to allow the rough charging articles to be discharged into the container B1 placed immediately therebelow.

Then, the control unit 22 commands the combination pattern generator 28 to start producing combination patterns. This begins combinatorial computations with the corrective charging weight TW used as a target. The combination pattern generator 28 takes in stored data from the rough charge selection memory 55 and generates combination patterns excluding those weighing sections corresponding to the bits "1" in the data from the memory 55. Combinatorial computations similar to those described above are carried out. When such combinatorial computations have been completed, the optimum combination memory 30 stores information having bits "1" corresponding to those weighing sections which are selected for corrective article charging. When the combinatorial computations with the corrective charging weight TW as the target have been brought to an end, the control unit 22 commands the drive control unit 31 to start a series of supply and discharge operations. After the weighing hopper gates 12f have been opened and the articles have entered the timing hopper 14, the control unit 22 issues a discharge signal to the drive control unit 31 in response to a discharge-permit signal from the packing machine 32. At this time, the control unit 22 also issues a discharge signal to the packing machine 32. In response to the discharge signal, the drive control unit 31 opens the timing hopper 14 to allow the corrective charging articles to be discharged into the container B1 in which the rough charging articles have already been charged. The foregoing cycle of operation will be repeated thereafter. In the foregoing description, combination patterns precluding those weighing sections already selected for rough charging are generated in combinatorial computations for corrective charging. However, the weight data from the weighing sections that have been selected for rough charging may be set as "0 g", and if any weighing sections selected for rough charging are contained in a finally selected combination pattern for corrective charging, such weiging sections may be inhibited.

Figure 4:
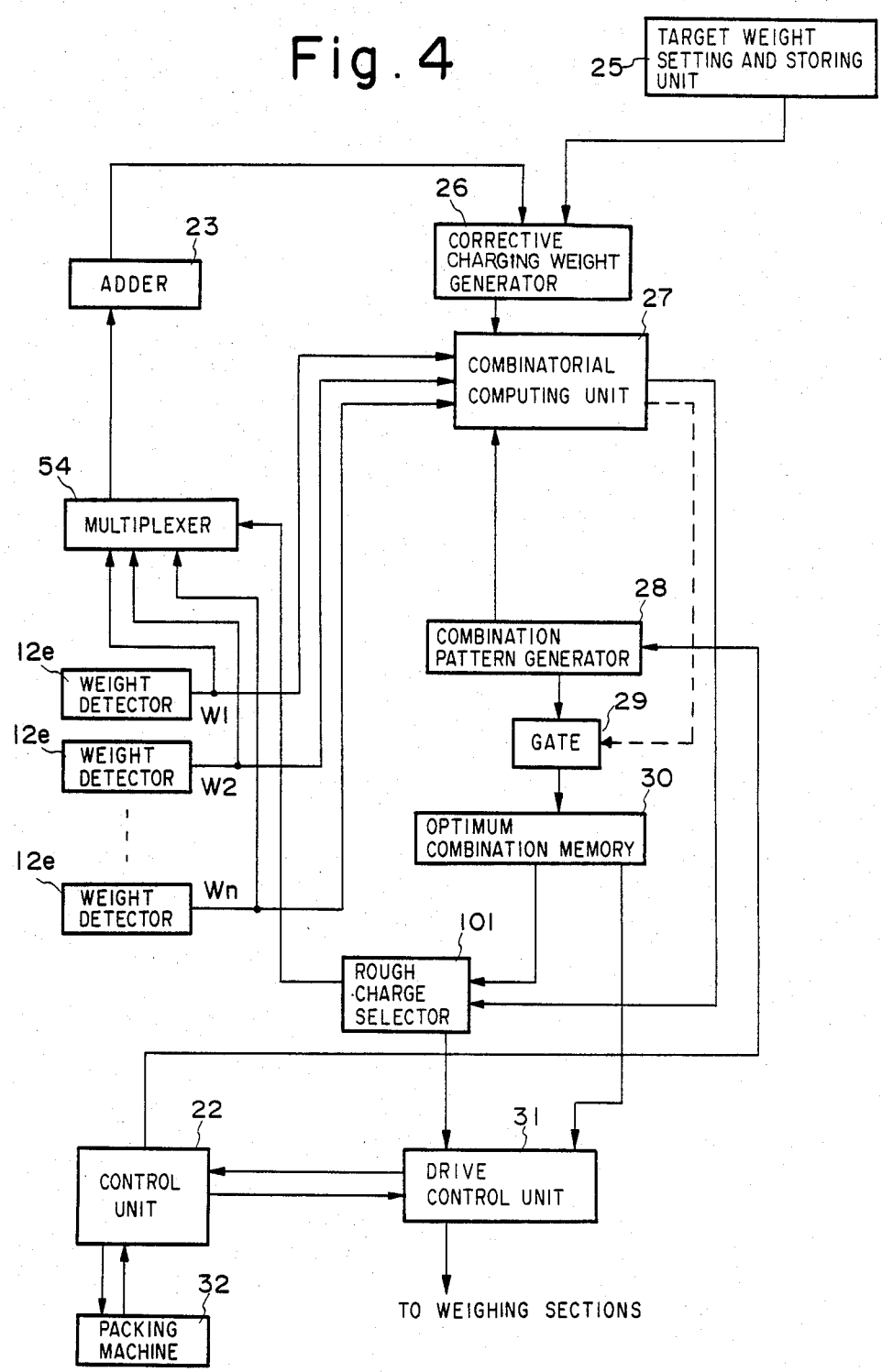
FIG. 4 is a block diagram of a combinatorial computing apparatus according to a third embodiment of the present invention.

FIG. 4 is a block diagram of a combinatorial computing apparatus according to a third embodiment of the present invention. Identical parts in FIG. 4 are denoted by identical reference characters in FIGS. 2 and 3. Designated in FIG. 4 at 101 is a rough charge selector. According to the second embodiment, the target rough charging weight is established, and rough charging weighing sections are selected through combinatorial computations. According to the third embodiment illustrated in FIG. 4, no combinatorial computations are performed, but another reference is utilized to select rough charging weighing sections. For example, such rough charging weighing sections may be selected sequentially in the order of their numbers to avoid their being selected overlappingly. A so-called multiple weighing operation is also possible in which all weighing sections are actuated to discharge articles for rough charging, then supplied with articles, and a combination of corrective charging weighing sections is selected from all of the weighing sections. Alternately, as illustrated in the third embodiment of FIG. 3, a rough charging target value may be established, weights may be added successively in the order of their greater magnitudes, and the selection of rough charging weighing sections may be interrupted just before the rough charging target is exceeded.

The embodiment of FIG. 4 is different from that of FIG. 3 only in that rough charging weighing sections are selected through the combinatorial computation or by another reference, and will operate in a similar manner. Therefore, detailed description of the operation of the apparatus shown in FIG. 4 will not be given here.

Figure 5:
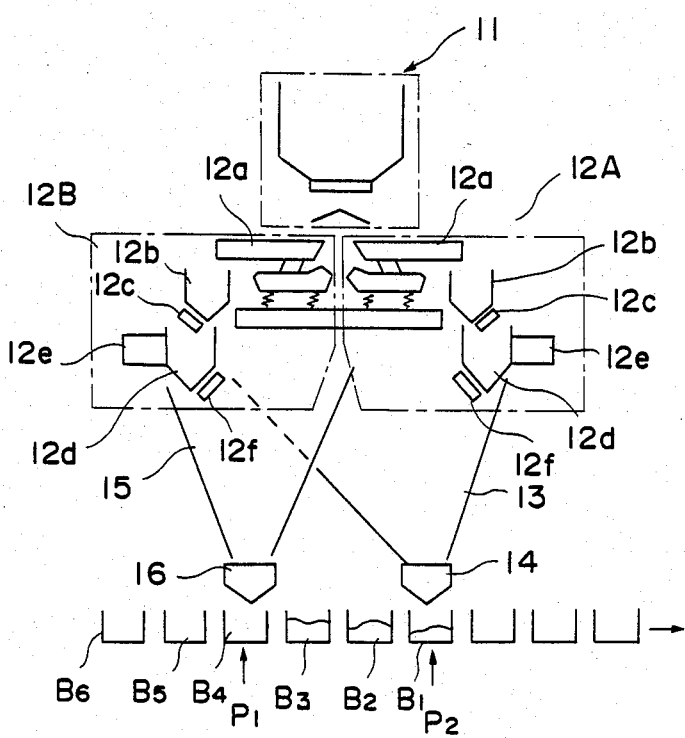
FIG. 5 is a schematic side elevational view of the mechanism of a combinatorial weighing apparatus according to a fourth embodiment of the present invention.

According to another arrangement shown in FIG. 5, a rough charging chute and a corrective charging chute are separately provided. Articles collected and discharged from the rough charging chute are charged into a container in a first position, and articles collected and discharged from the rough charging chute are charged into the same container in a second position.

The corrective charging chute, designated at 13, serves to collect, into a lower central portion, articles discharged from a plurality of weighing sections containing a combination of weighing sections 12A for corrective charging. The corrective charging chute 13 is of a conical funnel shape for collecting into the lower central portion those articles which have been discharged onto an outer peripheral edge by gravity or forcibly by a scraper (not shown). A timing hopper 14 serves to temporarily store the articles collected by the corrective charging chute 13, and charge the stored articles into a container placed outside the weighing apparatus in response to a discharge signal generated from a packing machine or other external source. The rough charging chute, designated at 15, serves to collect, into a lower central portion, articles discharged from weighing sections 12B for rough charging. The rough charging chute 15 is of a conical funnel shape for collecting into the lower central portion those articles which have been discharged onto an outer peripheral edge. A timing hopper 16 serves to temporarily store the articles collected by the rough charging chute 15, and charge the stored articles into a container placed outside the weighing apparatus in response to a discharge signal generated from a packing machine or other external source. Containers B1, B2, B3, . . . are arranged in a row to pass through a first point P1 where rough charging articles are discharged from the timing hopper 16 and a second point Pw where corrective discharged articles are discharged from the timing hopper 14.

Basic operation of the combinatorial weighing apparatus of the above construction will be described with reference to FIG. 5. It is now assumed that the number of all weighing sections 12A, . . . , 12B, . . . is n, a target weight is X (g), and a rough charging process is successively carried out Z times without effecting a corrective charging process at an initial stage, and then the corrective and rough charging processes are performed in parallel relationship. In such an instance, the number of rough charging processes is regarded as being Z.

Articles supplied from the main supply unit 11 are distributed and transported radially by the dispersion supply units 12a, 12a, . . . , and then charged into the pool hoppers 12b, 12b, . . . . Thereafter, the pool hopper gates 12c, 12c, . . . are opened to discharge the articles into the weighing hoppers 12d, 12d, . . . . Then, the dispersion supply units 12a, 12a, . . . are driven and simultaneously the pool hopper gates 12c, 12c, . . . are closed, whereupon articles are charged again into the pool hoppers 12b, 12b, . . . . When the apparatus has stopped vibrating after an inerval of time set by a timer, the articles in the weighing hoppers are weighed by the weight detectors 12e, 12e, . . . . Until articles are weighed Z times (Z=3, for example) after the weighing operation has started, the weighing hoppers 12d, 12d . . . of m weighing sections 12B, 12B, . . . determined the rough charging of articles having rough charging weights N1, N2, N3, successively into Z (=3) containers B1, B2, B3, and the rough charging weights N1, N2, N3 are stored in a shift register in a combinatorial weighing apparatus, described later on.

From (Z+1)th weighing process on, the rough charging weight N1 of the articles discharged Z times before is taken out of the shift register and a corrective charging weight is computed which is the difference between a target weight X and the rough charging weight N1. Weighing machines which give a sum weight combination equal or closest to the corrective charging weight are selected, through a combinatorial computation, from those weighing machines other than the m weighing sections, for rough charging. The weighing hopper gates 12f, 12f, . . . of the weighing hoppers 12d, 12d, . . . of the selected weighing machines, and the weighing hopper gates 12f, 12f, . . . of the rough charging weighing hoppers 12d, 12d, . . . are opened simultaneously or with a slight time delay to allow articles for correct charging to be collected into the timing hopper 14. The rough charging articles are collected through the rough charging chute 15 into the timing hopper 16. The rough charging weight $N_{Z+1}$ of the (Z+1)th weighing process is stored in the shift register. Upon elapse of a certain period of time, the weighing hopper gates 12f, 12f, . . . are closed, and at the same time prescribed pool hopper gates 12c, 12c . . . are opened to charge new articles from the pool hoppers 12b, 12b, . . . into the weighing hoppers 12d, 12d, . . . from which the articles have been discharged. After a certain interval of time has elapsed, the pool hopper gates 12c, 12c, . . . are closed and prescribed dispersion supply units 12a, 12a, . . . are driven to supply new articles into the pool hoppers 12b, 12b, . . . from which the articles have been discharged into the weighing hoppers 12d, 12d, . . . .

The articles collected in the timing hoppers 14 and 16 are charged into containers outside the weighing apparatus in response to a signal supplied from the packing machine. In the (Z+1)th weighing process (Z=3), the container B1, in which the articles having the weight N1 have been measured Z times, has arrived at a position directly below the timing hopper 14. When the timing hopper 14 is opened in response to the signal from the packing machine, the corrective charging articles having a total weight equal or closest to a corrective charging weight (X−N1) are charged into the container B1, and hence the articles having the target weight X are now charged in the container B1. An empty container B4 has been positioned beneath the timing hopper 16, and articles having a rough charging weight $N_{Z+1}$ (=N4) are charged into the container B4.

One cycle ((Z+1)th) of the weighing operation is now finished. Thereafter, the articles are weighed again, a rough charging weight N2 measured Z times before is taken out of the shift register, a corrective charging weight (X−N2) is determined, and a combinatorial computation with the corrective charging weight as a target weight value is effected, a process which is repeated in the same manner as described above. The weighing cycle of the weighing apparatus and the charging cycle of the packing machine are in mutual synchronism. When corrective charging articles are discharged from the weighing apparatus, the container which contains rough charging articles charged Z times before is located just below the timing hopper 14.

Figure 6:
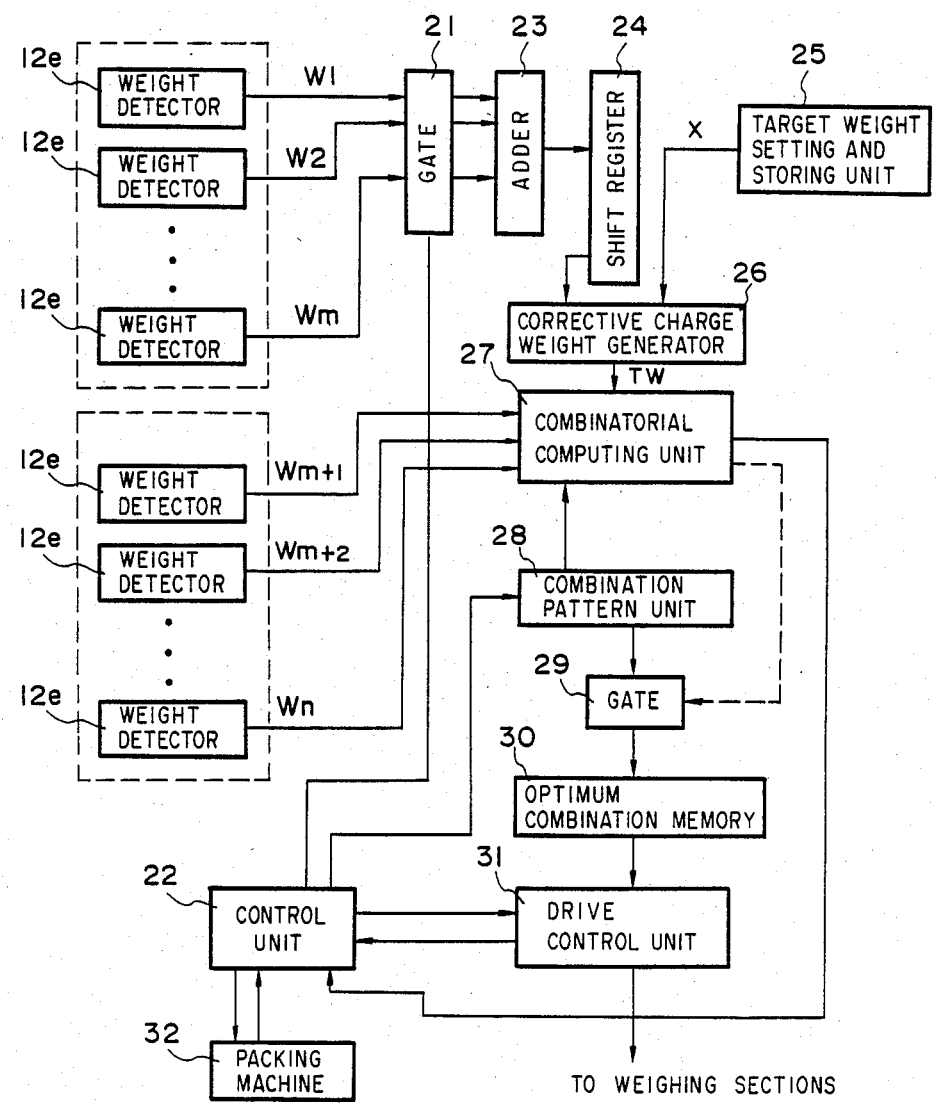
FIG. 6 is a block diagram of a combinatorial computing apparatus incorporated in the combinatorial weighing apparatus of FIG. 5.

FIG. 6 is a block diagram of a combinatorial computing apparatus. Of the n weight detectors 12e, the m weight detectors producing weight values W1-Wm are assumed to be associated with the weighing hoppers 12d of the rough charging weighing sections 12B, 12B, . . . , and the (n−m) weight detectors producing weight values Wm+1, Wm+2, . . . Wn are assumed to be associated with the weighing hoppers of the corrective charging weighing sections 12A, 12A, . . . .

When the weighing operation is started, a gate 21 is opened in response to a signal from a control unit 22 to allow the weight values W1-Wm from the rough charging weight detectors 12e, 12e, . . . to be delivered to an adder 23. The adder 23 computes a sum N1 of the supplied weight values, and stores such a sum N1 at a most significant bit position in a shift register 24. The shift register 24 has a memory containing Z positions or more which are equal to the number of rough charging processes, one position being composed of several bits. The shift register serves to shift the data one position at a time, and issues the data from the least significant position. A target weight setting and storing unit 25 sets and stores a target weight value X (g) which is furnished to a corrective charging weight generator 26. The corrective charging weight generator 26 is also supplied with the rough charging weight measured Z times before from the shift register 24 and computes and issues a corrective charging weight TW which is the difference between the target weight X and the rough charging weight measured Z times before. A combinatorial computing unit 27 is based on a combination pattern supplied from a combination pattern generator 28 for selecting and adding some of the outputs Wm+1-Wm from the weight detectors 12e, 12e, . . . of the corrective charging weighing sections, for computing a deviation or error between the total weight and the corrective charging weight TW, and for comparing the deviation or error with a stored content of an error memory (not shown) in the combinatorial computing unit 27. If the error is smaller than the stored data in the error memory, then the computed error is stored in the error memory and at the same time a gate 29 is opened to allow the combination pattern being generated by the combination pattern generator 28 to be stored in an optimum combination memory 30. Initial data stored in the error memory is equal to an upper limit of a preset allowable weight range. Accordingly, the stored data in the error memory at any time is equal to the difference or error between the corrective charging weight and one of the weight sums obtained for corrective charging through combinatorial arithmetic operations, which is closest to the corrective charging weight within the preset allowable weight range. The combination pattern genenerator 28 comprises an (n−m)-bit counter for counting ($2^{n-m}-1$) clock pulses (not shown) to generate $2^{(n-m)}-1$ combination patterns. The bits of the (n−m)-bit counter correspond respectively to the corrective charging weighing sections. When the ith bit of the combination patterns is "1", the output from the weight detector belonging to the ith corrective charging weighing section is delivered to the combinatorial computing unit 27. If, for example, a combination pattern (0100000011) is generated providing n=15, m=5, and n−m=10, the weights W6, W7, and W14 from the first, second, and ninth weight detectors are delivered to the combination computing unit 27. The combination computing unit 27 effects the computation of an error between the sum of added weights and the corrective charging weight, the comparison between the error and the stored data in the error memory, and the renewal of the error memory and the optimum combination memory 30. When an optimum comtination pattern is determined, a drive control unit 31 opens the weighing hopper gates 12f, 12f, . . . of the weighing hoppers 12d, 12d, . . . which give the optimum weight combination to discharge corrective charging articles into the chute 13.

The weighing operation of the mechanism and combinatorial computing apparatus shown in FIGS. 5 and 6 will be described. It is now assumed that the number of all weighing sections is 15 (n=15), the number of rough charging weighing sections is 5 (m=5), and a target weight is X (g).

The main supply unit 11 supplies articles into the dispersion supply units 12a, 12a, . . . dependent on how many articles have been discharged from the weighing apparatus, and the pool hoppers 12b, 12b, . . . . . The weighing hoppers 12d, 12d, . . . contain small numbers of articles, which are weighed by the weight detectors 12e, 12e, . . . .

For a first cycle of the weighing operation, the control unit 22 issues a signal to the gate 21 to open the latter, whereupon the adder 23 computes the sum N1 of the weights W1-W5 of the articles contained in the weighing hoppers assigned to the rough charging weighing sections, and delivers the computed sum N1 to the shift register 24 as a rough charging weight. Then, the control unit 22 applies a series of supply and discharge commands to the drive control unit 31, the commands include those for opening the weighing hopper gates 12f, 12f, . . . of the rough charging weighing hoppers. The weighing hopper gates 12f, 12f, . . . of all of the rough charging weighing hoppers are opened for a certain period of time, and then articles are supplied to the rough charging weighing hoppers and to the pool hoppers. When the articles are discharged from all of the rough charging weighing hoppers, the articles are collected into the timing hopper 16 through the rough charging chute 15. After having received a discharge-permit signal from the packing machine 32, the control unit 2 issues a discharge signal to the drive control unit 31 to open the timing hopper 16 for discharging the rough charging articles into a container positioned directly therebelow. This is the discharge of articles as a result of the first rough charging weighing operation.

At this time, the articles contained in the rough charging weighing hoppers 12d, 12d, . . . are rendered stable, and the outputs from the weight detectors 12e, 12e, are under a normal condition. The control signal again issues a signal for opening the gate 21 to effect a cycle of operation similar to the first cycle of the weighing operation.

The rough charging weighing operation is repeated from the first to the third cycle. From the fourth cycle, or the (Z+1)th cycle on, the apparatus enters a normal operation. As the weighing operations progress, the result of the first charging weighing process (rough weight), the second rough weight, and so forth, are successively issued from the least significant position of the shift register 24. Therefore, in the fourth weighing operation, the corrective charge weight generator 26 issues X (first rough charging weight Nl) to the combinatorial computing unit 27 as a corrective charging weight.

The apparatus will operate from the fourth cycle on as follows:

The control unit 22 commands the combination pattern generator 28 to start generating combination patterns. The combinatorial computing unit 27 operates based on the combination patterns to effect combinatorial computations for selecting a combination from corrective charging weighing sections which give a weight combination closest to a corrective weight, such a combination being stored in the optimum combination memory 30. When the combinatorial computations are finished the combinatorial computing unit 27 delivers an end signal to the control unit 22, which then issues an opening signal to the gate 21. The adder 23 computes the sum of the weight data (W1, W2, . . . Wn), and enters the computed sum as a (Z+1)th rough weight into the most significant position in the shift register 24. Then, the control unit 22 issues a series of supply and discharge start signals to the drive control unit 31.

The drive control unit 31 now opens the weighing hopper gates and closes the pool hopper gates of the weighing sections 12B, 12B, . . . assigned for rough charging and those weighing sections 12A, 12A, . . . which correspond to bits "1" in the optimum combination memory 30. The opened weighing hopper gates and pool hopper gates will be closed when of an interval of time set by a timer elapses. The drive control unit 31 also drives the dispersion supply units.

In response to a signal indicative of the opening of the weighing hopper gates by the drive control unit 31 and upon elapse of a given period of time, the control unit 22 waits for a discharge-permit signal from the packing machine 32, and issues a discharge command to the drive control unit 31 upon receipt of such a discharge-permit signal and also a signal indicative of an article discharge to the packing machine 32. The drive control unit 31 is responsive to the discharge command for opening the timing hoppers 14 and 16 to discharge the rough charging and corrective charging articles.

The foregoing cycle of operation will be repeated.

Figure 7:
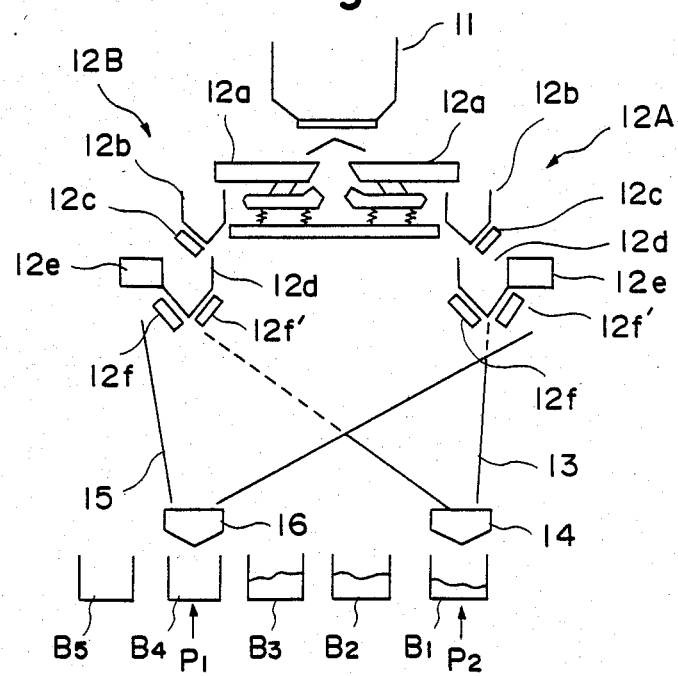
FIG. 7 is a schematic side elevational view of the mechanism of a combinatorial weighing apparatus according to a fifth embodiment of the present invention.

FIG. 7 is a schematic view of the mechanism of a combinatorial weighing apparatus according to a fifth embodiment of the present invention.

Identical parts shown in FIG. 7 are designated by identical reference characters in FIG. 5. The combinatorial weighing apparatus shown in FIG. 7 (fifth embodiment) well correspond to the combinatorial weighing apparatus shown in FIG. 5 (fourth embodiment). In the fourth embodiment, only one weighing hopper gate 12f, 12f, . . . is associated with each weighing hopper 12d, 12d, . . . . In the fifth embodiment, however, two weighing hopper gates 12f, 12f, . . . and 12f', 12f', . . . are associated with each weighing hopper 12d, 12d, . . . . With the weighing apparatus according to the fourth embodiment, the weighing sections are divided into rough and corrective charging weighing sections, and no one weighing hopper is capable of discharging articles to both rough and corrective charging chutes. However, the weighing sections in the weighing apparatus of the fifth embodiment are not divided, but can be used for both rough and corrective charging operations. With the weighing apparatus of the fifth embodiment, each weighing section is employed for rough charging of articles at one time and for corrective charging of articles at another time. When used for rough charging, one of the weighing hopper gates 12f is opened to discharge articles into the rough charging chute 15. When used for corrective charging, the other weighing hopper gate 12f is opened to discharge articles into the corrective charging chute 13.

Figure 8:
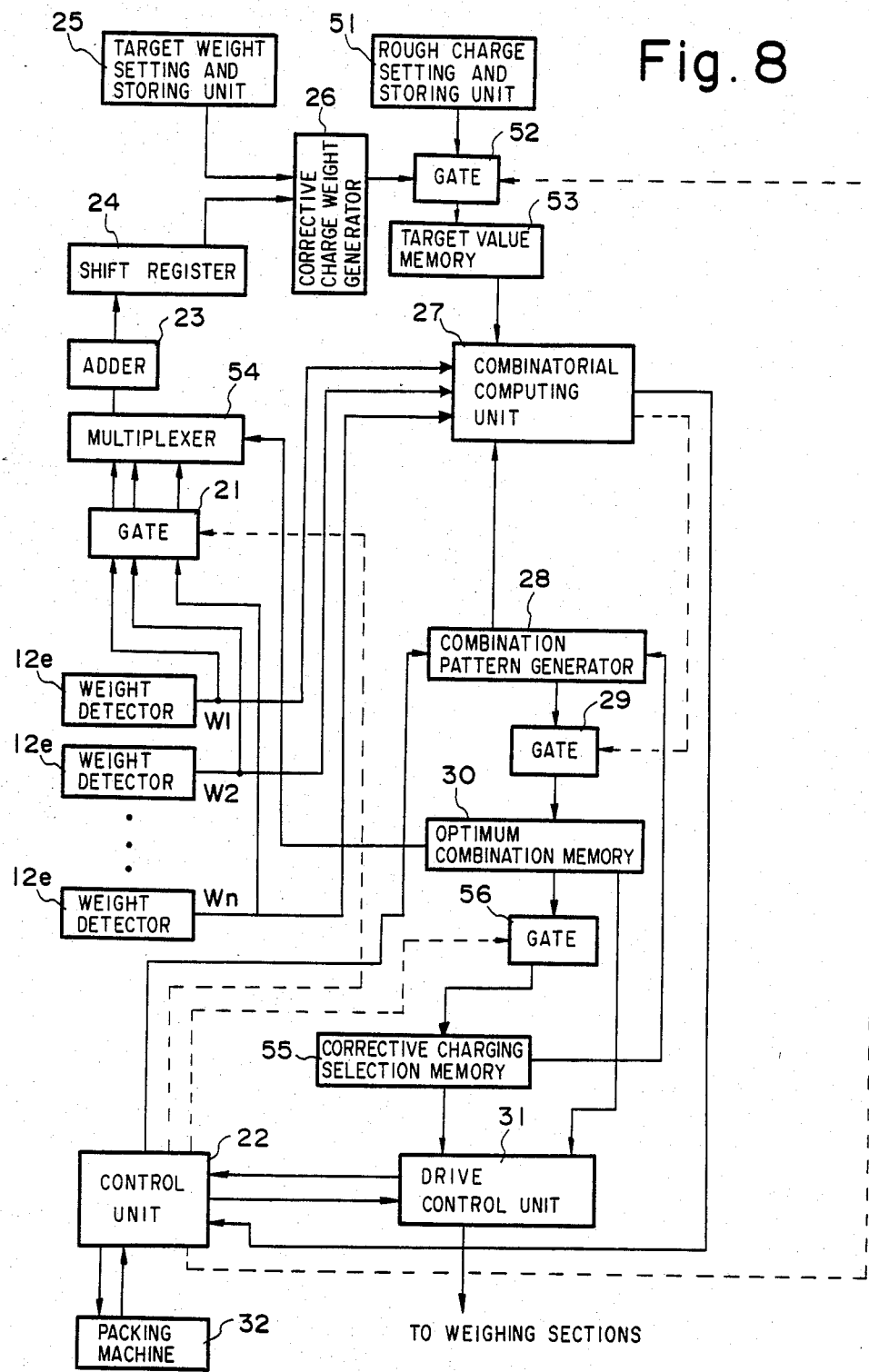
FIG. 8 is a block diagram of a combinatorial computing apparatus incorporated in the combinatorial weighing apparatus of FIG. 7.

FIG. 8 is a block diagram of a combinatorial weighing apparatus employed for use with the combinatorial weighing apparatus according to the fifth embodiment. Identical parts illustrated in FIG. 8 are designated by identical reference characters in FIG. 6, and will not be described in detail.

A rough charge setting and storing unit 51 serves to set and store a target for a weight measured for rough article charging (hereinafter referred to as a "target rough weight"). A gate 52 is responsive to a signal from a control unit 22 for inputting the corrective weight TW generated from a corrective weight generator 26 or the target rough weight stored in the rough charge setting and storing unit 51 into a target value memory 53. A combinatorial computing unit 27 effects combinatorial computations with the stored content of the target value memory 53 being used as a target value. A gate 21 opens under a command from the control unit 22 to transmit outputs from the weight detectors 12e, 12e, . . . to a multiplexer 54. The multiplexer 54 is responsive to stored data in an optimum combination memory 30 for successively delivering the outputs from the weight detectors 12e, 12e, . . . of the weighing sections corresponding to bits "1" in the memory 30 to an adder 23. A rough charge selection memory 55 serves to receive and store the data from the optimum combination memory 30 when a gate 56 is opened. The weighing sections which are actuated by a drive control unit 31 to discharge articles are indicated by the rough charge selection memory 55 and the optimum combination memory 30. The rough charge selection memory 55 contains the result of a rough charging weighing operation, while the optimum combination memory 30 contains the result of a corrective charging weighing operation.

The combinatorial weighing apparatus of the fifth embodiment differs from that of the fourth embodiment in that corrective charging combinatorial computations are performed to select corrective charging weighing sections from all weighing sections, and then rough charging combinatorial computations are performed to select rough charging weighing sections from the remaining weighing sections.

Operation of the combinatorial weighing apparatus according to the fifth embodiment will be described with reference to FIGS. 7 and 8.

The main supply unit 11 supplies articles into the dispersion supply units 12a, 12a, . . . dependent on how many articles have been discharged by the weighing apparatus, and the pool hoppers 12b, 12b, . . . , and the weighing hoppers 12d, 12d, . . . contain small numbers of articles, which are weighed by the weight detectors 12e, 12e, . . . . The control unit 22 controls the gate 52 to allow the target rough charging weight stored in the rough charge setting and storing unit 51 to be stored in the target memory 53, and enables the combination pattern generator 28 to start generating combination patterns. Combinatorial computations are effected by the combinatorial computing unit 27 with the stored data in the rough charge setting and storing unit 51 serving as a target. The optimum combination memory 30 stores a weight combination having bits "1" corresponding to the selected weighing sections. In response to a signal indicative of the ending of the combinatorial computations supplied from the combinatorial computing unit 27, the control unit 22 issues an opening command to the gate 21. According to the stored content of the optimum combination memory 30, the multiplexer 54 successively delivers the weight data (W1, W2, . . . Wn) from the weighing sections corresponding to bits "1" of the data stored in the optimum combination memory 30 to the adder 23. The adder 23 computes the sum of the weight data and enters the sum as a first rough charging weight into the shift register 24. Thereafter, the control unit 22 issues a series of supply and discharge start signals to the drive control unit 31. The drive control unit 31 then discharges the rough charging articles based on the optimum combination pattern, and performs other processes.

Each of the weighing hoppers 12d, 12d, . . . is equipped with two weighing hopper gates 12f and 12f'. One of the hopper gates 12f serves to discharge articles through the rough charging chute 15 into the timing hopper 16, and the other hopper gate 12f discharges articles via the corrective charging chute 13 into the timing hopper 14. When the weiging hopper gates are to be opened, the drive control unit 31 opens the weighing hopper gates 12f' leading to the rough charging chute 15 based on the stored data in the optimum combinatorial memory 30, and opens the weighing hopper gates 12f leading to the corrective charging chute 13 based on the stored data in the corrective charging selection memory 55. During the first through Zth cycles of the weighing operation after the weighing operation has started, the corrective charging selection memory 55 is cleared, and the weighing hopper gates 12f' and the pool hopper gates 12b, 12b, . . . are opened and the dispersion supply units 12a, 12a, . . . are driven only for the weighing sections that have been selected for rough charging. A predetermined period of time after the drive control unit 31 has opened the weighing hopper gates 12f', the control unit 22 waits for a discharge-permit signal from the packing machine 32 and then delivers a discharge signal to the drive control unit 31 in response to the discharge-permit signal. The drive control unit 31 is responsive to the discharge signal for opening the timing hopper 16 for a given interval of time to discharge the rough charging articles into the container B1 placed immediately therebelow.

For the (Z+1)th weighing cycle of operation, the control unit 22 enables the gate 52 to transfer the corrective charging weight from the corrective charge weight generator 26 into the target value memory 53, and energizes the combination pattern 28 to start producing combination patterns. Then, combinatorial computations are carried out in which a target weight value is given by (the weight − the weight of rough charging articles discharged Z times before), for thereby selecting a combination from combinations of weight values (W1, W2, . . . Wn) which gives a total weight equal or closest to the target within an allowable range. When all of combination patterns have been generated and combinatorial computations based on the combination patterns have been finished, the combinatorial computing unit 28 issues an end signal to the control unit 22. In response to the end signal, the control unit 22 transfers the target rough charging weight value stored in the rough charge setting and storing unit 51 into the target value memory 53 through the gate 52, and at the same time issues an opening signal to the gate 56. Thus, the stored data in the rough charge setting and storing unit 51 enters the target value memory 53, and the stored data in the optimum combination memory 30 enters the corrective charging selection memory 55.

Then, the control unit 22 commands the combination pattern generator 28 to start producing combination patterns. The combination pattern generator 28 takes in stored data from the rough charge selection memory 55 and generates combination patterns excluding those weighing sections corresponding to the bits "1" in the data from the memory 55. Combinatorial computations similar to those described above are carried out. When such combinatorial computations have been completed, the optimum combination memory 30 stores information having bits "1" corresponding to those weighing sections which are selected for rough article charging.

When the combinatorial computations have been brought to an end, the combinatorial computing unit 27 issues a command to open the gate 21. As a result, the multiplexer 54 successively delivers the weight data (W1, W2, . . . Wn), corresponding to the bits "1" in the stored data in the optimum combination memory 30, to the adder 23, and the sum from the adder 23 is entered as the (Z+1)th rough charging weight value into the most significant position in the shift register 24.

After such data entry into the shift register 24, the control unit 22 commands the drive control unit 31 to start a series of supply and discharge operations. After the weighing hopper gates 12f and 12f' have been opened and the articles have entered the timing hoppers 14 and 16, the control unit 22 issues a discharge signal to the drive control unit 31 in response to a discharge-permit signal from the packing machine 32. At this time, the control unit 22 also issues a discharge signal to the packing machine 32. In response to the discharge signal, the drive control unit 31 opens the timing hoppers 14 and 16 to allow the rough charging articles to be discharged into an empty container and the corrective charging articles to be discharged into the container in which the rough charging articles measured Z times before have already been charged. The foregoing cycle of operation will be repeated thereafter. In the foregoing description, combination patterns precluding those weighing sections already selected for rough charging are generated in combinatorial computations for corrective charging. However, the weight data from the weighing sections that have been selected for rough charging may be set as "0 g", and if any weighing sections selected for rough charging are contained in a finally selected combination pattern for corrective charging, such weiging sections may be inhibited.

FIG. 9 is a block diagram of a combinatorial computing apparatus according to a sixth embodiment of the present invention. Identical parts in FIG. 9 are denoted by identical reference characters in FIGS. 6 and 8. Designated in FIG. 9 at 101 is a rough charge selector capable of selecting rough charging weighing sections from those precluding the weighing sections which give a weight combination closest to a corrective charging weight. According to the fifth embodiment, the target rough charging weight is established, and rough charging weighing sections are selected through combinatorial computations. According to the sixth embodiment illustrated in FIG. 9, no combinatorial computations are performed, but another reference is utilized to select rough charging weighing sections. For example, all weighing sections left after corrective charging weighing sections have been selected may be utilized for rough charging, or rough charging weighing sections may be selected to avoid overlapping selection. As an improvement of the present invention, a so-called multiple weighing operation is also possible in which all weighing sections are actuated to discharge articles for rough charging, then supplied with articles, and a combination of corrective charging weighing sections is selected from all of the weighing sections.

Alternatively, as illustrated in the fifth embodiment of FIG. 8, a rough charging target value may be established, weights may be added successively in the order of their magnitudes, and the selection of rough charging weighing sections may be interrupted just before the rough charging target is exceeded.

With the arrangement of the present invention, articles can be charged separately in two steps so that large-volume articles can be charged with an increased charging efficiency, and problems such as a bridge of articles across a discharge port in the weighing apparatus, can be eliminated. The weighing apparatus of the present invention has a mechanism which does not differ from that of conventional weighing apparatus, and hence is prevented from becoming large in size and can be installed in a small space. The present invention is advantageous in that it involves no design change in its mechanism.

The weighing apparatus according to the first through sixth emboidments have the following respective advantages:

According to the first embodiment in which rough charging weighing sections are fixedly provided, there is no need for rough charging combinatorial computations, and hence high-speed operation is possible.

With the second embodiment, the time required for computations is slightly longer and the mechanism is a bit more complex as two combinatorial computations are necessary in each cycle. Since however articles are more or less constantly supplied into weighing sections, it is possible to keep rough charging articles in a constant range, and better weighing operations can be effected at all times. Though in the first embodiment (n−m) weighing sections are available for taking part in corrective charging combinatorial computations, all of n weighing sections can be employed for such computations in the second embodiment, a feature which leads to an improved weighing accuracy for ordinary articles to be weighed.

According to the third embodiment, the time required for combinatorial computations is reduced while benefiting to some extent from the advantages of the second embodiment.

The combinatorial weighing apparatus of the fourth embodiment is not mechanically different to a large degree from a single conventional combinatorial weighing apparatus except for two rough and corrective charging chutes, two weighing hopper gates attached for each weighing hopper, and a plurality of movable containers directly below both the chutes. The weighing apparatus of the fourth embodiment is therefore prevented from getting large in size and needs a relatively small area for installation. Only one weighing hopper gate may be provided for each weighing hopper, and the chutes and weighing hoppers may be simple in construction.

The fifth embodiment has substantially the same advantages as those of the second embodiment.

A method of selecting all of the remaining weighing sections as rough charging weighing sections after combinatorial computations have been made to select corrective charging weighing sections in the sixth embodiment has the problem of a failure in severe control of the number of rough charging articles, so that the number of articles to be charged into the weighing sections should be adjusted in advance in their relationship to weight values. For example, it is preferable to adjust the numbers of articles supplied to the respective weighing sections such that articles will be substantially uniformly supplied to the weighing sections, and the total weights of the articles from all of the weighing sections is about 1.5 times a target weight value at the time of combinatorial computations for rough charging, and about $(1+\alpha)$ times the target weight value when all of the remaining weighing sections are utilized for rough charging of articles after combinatorial computations have been carried out for corrective charging. This results in the ratios of the quantities of rough and corrective charges to be $\frac{2}{3}$ and $\frac{1}{3}$, respectively, to the target value. With this arrangement, articles have no tendency to remain unselected in weighing sections for a long period of time, an advantage for such articles as frozen foods, refrigerated foods, and deliquescent materials.

Although certain preferred embodiments have been shown and described, it should be understood that many changes and modifications may be made therein without departing from the scope of the appended claims.

What is claimed is:

1. A combinatorial weighting apparatus having a plurality of weighing machines including weighing hoppers charged with batches of articles to be weighed and weight detectors for measuring the weights of the batches of articles charged into the weighing hoppers, so that a combination of batches of articles which gives a total weight value equal or closest to a target weight value can be selected and discharged, said combinatorial weighing apparatus comprising:

at least one predetermined weighing machine for discharging at least one batch of articles for a rough charging operation;

combinatorial computing means for computing a total weight of said at least one batch of articles discharged from said at least one predetermined weighing machine for the rough charging operation as a rough charging weight value and for selecting a combination of weighing machines for a corrective charging operation which gives a total weight combination equal or closest to a corrective charging weight value which is the difference between the target weight value and said rough charging weight value;

discharge control means for discharging along a first discharge path, said at least one batch of articles from said at least one predetermined weighing machine for the rough charging operation at a prescribed first timing, and for discharging along a second discharge path, said batches of articles for the corrective charging operation from said selected combination of weighing machines at a second timing; and a chute, positioned in said first and second discharge paths, for collectively discharging the separately discharged batches of articles for the rough charging operation and for the corrective charging operation into a single location.

2. A combinatorial weighing apparatus having a plurality of weighing machines including weighing hoppers charged batches of articles to be weighed and weight detectors for measuring the weights of the batches of articles charged into the weighing hoppers, so that a combination of batches of articles which gives a total weight value equal or closest to a target value can be selected and discharged, said combinatorial weighing apparatus comprising:

means for selecting weighing machines which discharge batches of articles for a rough charging operation;

combinatorial computing means for computing a total weight of batches of articles discharged from said selected weighing machines for the rough charging operation as a rough charging weight value and for selecting a combination of weighing machines for a corrective charging operation which gives a total weight combination equal or closest to a corrective charging weight value whichlis the difference between the target weight value and said rough charging weight value;

discharge control means for discharging along a first discharge path, said batches of articles for the rough charging operation from said selected weighing machines at a prescribed first timing, and for discharging along a second discharge path, batches of articles for the corrective charging operation from said selected combination of weighing machines at a second timing; and a chute, positioned in said first and second discharge paths, for collectively discharging the separately discharged batches of articles for the rough weighing operation and the corrective charging operation into a single location.

3. A combinatorial weighing apparatus according to claim 2, further comprising means for setting a target rough charging weight value and selecting weighing machines giving a total weight combination closest to said target rough charging weight value for the rough weighing operation.

4. A combinatorial weighing apparatus having a plurality of weighing machines composed of weighing hoppers charged with batches of articles to be weighed and weight detectors for measuring the weights of the batches of articles charged into the weighing hoppers, so that a combination of batches of articles which gives a total weight value equal or closest to a target weight value can be selected and discharged into a container, said combinatorial weighing apparatus comprising:

a rough charging chute, positioned adjacent to the weighing hoppers, for collectively discharging into a single location batches of articles discharged from at least one of the weighing hoppers and providing a rough charging weight value smaller than the target weight value;

combinatorial computing means for selecting a combination of batches of articles which combine to form a total weight combination equal or closest to a corrective charging weight value which is the difference between the target weight value and said rough charging weight value;

a corrective charging chute, positioned adjacent the weighing hoppers, for collectively discharging into another single location said combination of batches of articles selected by said combinatorial computing means; and means for charging said batches of articles collectively discharged from said rough charging chute into the container at a first position and for charging said batches of articles collectively discharged from said corrective charging chute into the container at a second position.

5. A combinatorial weighing apparatus according to claim 4, wherein said rough charging chute discharges said batches of articles combining to form said rough charging weight value from predetermined weighing machines, and wherein said corrective charging chute discharges said combination of batches of articles combining to form said total weight combination closest to said corrective charging weight value by combining the weight values of said batches of articles charged in weighing machines other than said predetermined weighing machines.

6. A combinatorial weighing apparatus according to claim 4, further comprising:

means for setting a target rough charging weight value;

means for selecting a combination of weighing machines providing an adjusted corrective charging weight value corresponding to said target rough charging weight value;

means for effecting combinatorial computations on weight data from the weighing machines precluding said combination of weighing machines and selecting a combination of batches of articles combining to form a total weight combination closest to said target rough charging weight value;

means for charging said combination of batches of articles into said container in said first position; and means for storing an actual rough charging weight value.

7. A combinatorial weighing apparatus according to claim 4, further comprising:

means for selecting a combination of weighing machines combining to form said corrective charging weight value;

means for selecting said batches of articles charged into weighing machines other than said selected combination of weighing machines and producing the total weight value of said selected batches of articles as a rough charging weight value; and means for storing said rough charging weight value and discharging said selected batches of articles into the container in said first position.

8. A combinatorial weighing apparatus having a plurality of weighing machines including weighing hoppers charged with batches of articles to be weighed and weight detectors for measuring the weights of the batches of articles charged into the weighing hoppers, so that a combination of batches of articles which gives a total weight value equal or closest a target weight value can be selected and discharged into a single container, said combinatorial weighing apparatus comprising:
- a rough charging chute, positioned adjacent to the weighing hoppers, for collectively discharging into a single location batches of articles discharged from at least one of the weighing hoppers combining to form a rough charging weight value smaller than the target weight value;
- combinatorial computing means for selecting a combination of batches of articles which combine to form a total weight combination equal or closest to a corrective charging weight value which is the difference between the target weight value and said rough charging weight value;
- a corrective charging chute, positioned adjacent the weighing hoppers, for collectively discharging into another single location said batches of articles selected by said combinatorial computing means;
- means for charging batches of articles having rough charging weight values $Ni+1, Ni+2, \ldots Ni+z$, respectively, into Z containers $Bi+1, Bi+2, \ldots Bi+z$ at a first position;
- a shift register, coupled to the weighing hoppers, for storing said rough charging weight values $Ni+j$ ($j=1, 2, \ldots z$);
- means for taking said rough charging weight value $Ni+1$ out of said shift register, selecting a combination of batches of articles combining to form a total weight combination closest to a corrective charging weight value $(X-Ni+1)$ through said combinatorial computing means, charging said selected combination of batches of articles through said corrective charging chute into said container $Bi+1$ at a second position, and charging said articles, combining to form an $(i+z+1)$th rough charging weight value $Ni+z+1$, through said rough charging chute into said container $Bi+z+1$ at said first position; and
- means for charging said batches of articles combining to form said rough charging weight value and said batches of articles combining to form said corrective charging weight value into the single container.

9. A combinatorial weighing apparatus for providing a total weight value equal or closest to a target weight value, comprising:
- hoppers for respectively receiving batches of articles, at least one predermined hopper of said hoppers discharging at least one batch of articles during a rough charging operation;
- combinatorial computing means, for computing the total weight of said at least one batch of articles discharged during the rough charging operation as a rough charging weight value, and for selecting a combination of the remaining said hoppers during a corrective charging operation to provide a total weight combination equal or closest to a corrective charging weight value which is the difference between the target weight value and said rough charging weight value;
- discharge control means for discharging, at a first time and through a first discharge path, said at least one batch of articles having the rough charging weight value from said at least one predetermined hopper and for discharging, at a second time and through a second discharge path, said selected combination of the remaining batches of articles combining to form the corrective charging weight value; and
- a chute, positioned in said first and second discharge paths, for collectively discharging said batches of articles having the rough charging weight value and the corrective charging weight value at a single location.

* * * * *

UNITED STATES PATENT AND TRADEMARK OFFICE
CERTIFICATE OF CORRECTION

PATENT NO. : 4,494,619  Page 1 of 5
DATED : JANUARY 22, 1985
INVENTOR(S) : TADAAKI MATSUNO It is certified that error appears in the above-identified patent and that said Letters Patent is hereby corrected as shown below:

```
Col. 1, line 67, "dischages" should be --discharges--.

Col. 3, line 25, "n" should be --n--;
        line 48, "(m)" should be --(m)--;
        line 57, "dischaged" should be --discharged--;
        line 58, delete "downward".

Col. 4, line 6,  "n" should be --n--;
        line 9,  "outwrd" should be --outward--;
        line 22, "m" should be --m--;
        line 23, "<"  (2nd occurrences) should be-- < --;

line 32, "m" should be --m--;
        line 62, "n" should be --n--; and
                 "m" should be --m--;
        line 63, "Wm" should be --Wm--;
        line 66, "(n-m)" should be --(n-m)--;
        line 67, "Wm" (both occurrences) should be --Wm--.
```

UNITED STATES PATENT AND TRADEMARK OFFICE
CERTIFICATE OF CORRECTION

PATENT NO. : 4,494,619

DATED : JANUARY 22, 1985

INVENTOR(S) : TADAAKI MATSUNO

It is certified that error appears in the above-identified patent and that said Letters Patent is hereby corrected as shown below:

```
Col. 5, line  4, "Wm" should be --W$\underline{m}$--;
        line 18, "Wm" (both occurrences) should be --W$\underline{m}$--;
        line 40, "(n-m)" should be --($\underline{n}$-$\underline{m}$)--;
        line 43, "(n-m)" should be --($\underline{n}$-$\underline{m}$)--;
        line 44, "ith" should be --$\underline{i}$th--;
        line 67, "(n=15)" should be --($\underline{n}$=15)--;
        line 68, "(m=5)" should be --($\underline{m}$=5)--.

Col. 7, line 66, "Wn)" should be --W$\underline{n}$)--.

Col. 8, line 11, delete "55" (first occurrence);
        line 13, "siganls" should be --signals--;
        line 65, "weiging" should be --weighing--.

Col. 10, line  4, "n," should be --$\underline{n}$,--;
         line 21, "inerval" should be --interval--;
         line 41, "m" should be --$\underline{m}$--.
```

UNITED STATES PATENT AND TRADEMARK OFFICE
CERTIFICATE OF CORRECTION

PATENT NO. : 4,494,619
DATED : JANUARY 22, 1985
INVENTOR(S) : TADAAKI MATSUNO

It is certified that error appears in the above-identified patent and that said Letters Patent is hereby corrected as shown below:

```
Col. 11, line 27,  "n" should be --n--; and
                   "m" should be --m--;
         line 28,  "Wm" should be --Wm--;
         line 31,  "(n-m)" should be --(n-m)--;
         line 32,  "Wm" (both occurrences) should be
                   --Wm--;
         line 37,  "Wm" should be --Wm--;
         line 59,  "Wm" (both occurrences) should be
                   --Wm--.

Col. 12, line 11,  "(n-m)" should be --(n-m)--;
         line 14,  "(n-m)" should be --(n-m)--;
         line 15,  "ith" should be --ith--;
         line 17,  "ith" should be --ith--;
         line 20,  "n=15, m=5," should be
                   --n=15, m=5,--;
         line 21,  "n-m-10" should be --n-m=10--;
         line 29,  "comtination" should be --combination--;
         line 37,  "(n=15)" should be --(n=15)--;
         line 38,  "(m=5)" should be --(m=5)--.
```

UNITED STATES PATENT AND TRADEMARK OFFICE
CERTIFICATE OF CORRECTION

PATENT NO. : 4,494,619            Page 4 of 5
DATED       : JANUARY 22, 1985
INVENTOR(S) : TADAAKI MATSUNO It is certified that error appears in the above-identified patent and that said Letters Patent is hereby corrected as shown below:

```
Col. 13, line 8.  "12e, are" should be --12e, . . . are--;
         line 9,  "issures" should be --issues--.

Col. 15, line 27, "Wn)" should be --Wn)--;
         line 43, "weiging" should be --weighing--.

Col. 16, line 9,  "Wn)" should be --Wn)--;
         line 40, "Wn)" should be --Wn)--.

Col. 17, line 2,  "weiging" should be --weighing--;
         line 21, "selected" should be --sequentially
                     selected--;
         line 37, "problems" should be --problems,--;
         line 47, "emboidments" should be --embodiments--;
         line 61, "(n-m)" should be --(n-m)--;
         line 63, "n" should be --n--.

Col. 18, line 49, "weighting" should be --weighing--.
```

UNITED STATES PATENT AND TRADEMARK OFFICE
CERTIFICATE OF CORRECTION

PATENT NO. : 4,494,619
DATED : JANUARY 22, 1985
INVENTOR(S) : TADAAKI MATSUNO

It is certified that error appears in the above-identified patent and that said Letters Patent is hereby corrected as shown below:

```
Col. 19, line 38, "whi-" should be --which--;
         line 39, "ch!is" should be --is--.

Col. 21, line 5, "value" should be --value (X)--.
```

Signed and Sealed this

Twenty-fourth Day of September 1985

[SEAL]

Attest:

Attesting Officer

DONALD J. QUIGG

Commissioner of Patents and Trademarks—Designate